United States Patent [19]

Nakajima et al.

[11] Patent Number: 4,474,663

[45] Date of Patent: Oct. 2, 1984

[54] METHOD OF REGENERATING GELS FOR USE IN LIQUID CHROMATOGRAPHY

[75] Inventors: Shigeru Nakajima, Okayama; Masahiko Ozaki, Ootsu, both of Japan

[73] Assignee: Japan Exlan Company, Limited, Osaka, Japan

[21] Appl. No.: 461,975

[22] Filed: Jan. 26, 1983

[30] Foreign Application Priority Data

Feb. 9, 1982 [JP] Japan ................................. 57-20039

[51] Int. Cl.$^3$ ............................................ B01D 15/08
[52] U.S. Cl. .................................... 210/635; 210/656; 210/670
[58] Field of Search ................ 210/670, 672, 635, 656

[56] References Cited

U.S. PATENT DOCUMENTS 3,749,698 7/1973 Lehmann et al. ............... 210/670 X
3,762,948 10/1973 Moaton et al. .................. 210/670 X
3,808,124 4/1974 Dziobkowski ..................... 210/635

OTHER PUBLICATIONS

Chromatographic and Allied Methods by Mikes, Pub. by John Wiley & Sons of N.Y., pp. 368 and 369.

Primary Examiner—John Adee
Attorney, Agent, or Firm—Wenderoth, Lind & Ponack

[57] ABSTRACT

This invention provides an industrially advantageous method of regenerating a large quantity of contaminated gels by treating a contaminated gel which has become less active in separation performance with an aqueous solution of a metallic salt or ammonium salt of thiocyanic acid, nitric acid, or hydrogen iodide having a concentration of from 30 weight % to saturation, at a temperature between 50° and 120° C., thereby effectively removing contaminants in the interstices among the gel particles or contaminants on the active points.

3 Claims, No Drawings

METHOD OF REGENERATING GELS FOR USE IN LIQUID CHROMATOGRAPHY

BACKGROUND OF THE INVENTION

1. Field of the Invention

This invention relates to a method of regenerating gels for use in liquid chromatography which have been contaminated by longtime use and have become less active in separation performance.

2. Description of the Prior Art

In recent years, liquid chromatography is used not only as an analytical means but also as one of the industrial separation means in many fields such as the food industry, the medical product industry, the chemical industry (synthesis or purification of intermediate products), the inorganic industry and the fiber industry. In such industrial fields, since a large quantity of expensive gels are packed in enormous columns, it is very important to maintain the life of the gel in the columns for a long time. But after a long period of operation of liquid chromatography, the gel is contaminated and its separation performance is gradually lowered, so that in due time it is necessary to replace the gel with new one. A gel having a high separation performance and a high treating ability is generally expensive, and therefore several proposals have been made for the regeneration of gels in order to diminish such consumption of the gel. For example, it is known to remove the impurities by decantation and to wash the gel with a solution of a neutral detergent. By such means, the impurities which have adhered to the gel surface or come into the interstices among the gel particles can be removed to some extent, but such methods are nearly ineffective for the contaminants in the pores of the gel particles or the contaminants at the active Points which are chemically combined and introduced as one of the components of the gel material. Therefore, the necessity of developing means regenerating gels in a more effective manner is strongly desired.

STATEMENT OF THE INVENTION

Under such circumstances, we studied intensively to solve this problem. As a result, we have found that, by treating a contaminated gel with an aqueous solution of a specific salt of high temperature and high concentration, the binding power due to the interaction between the gel and the contaminants caused by the Van der Waals force, hydrophobic bonds, hydrogen bonds, etc. can be weakened, whereby the contaminants in the interstices among the gel particles and the contaminants at the active points can be removed effectively. The present invention is based on this discovery.

Therefore, the primary object of the invention is to provide a method of regenerating a large quantity of a contaminated gel in an industrially advantageous manner. Other objects of the invention will become apparent from the following concrete explanation of the invention.

The above-mentioned objects of the invention are attained by treating a contaminated gel which has become less active in separation performance with an aqueous solution of a metallic salt or an ammonium salt of thiocyanic acid, nitric acid or hydrogen iodide, at a temperature between 50° and 120° C.

DESCRIPTION OF PREFERRED EMBODIMENT

Among the salts which can be employed for the regeneration of contaminated gels in the present invention, there may be mentioned metallic salts (salts of alkali-metals such as Na, K, Li, etc.; salts of alkali-earth-metals such as Be, Mg, Ca, Ba, etc.; and salts of metals such as Zn, Ni, Mn, etc.) or ammonium salts of thiocyanic acid, nitric acid or hydrogen iodide. Among others, metallic salts, especially alkali-metal salts or ammonium salt of thiocyanic acid are preferable in respect to their ability to regenerate contaminated gels.

It is necessary that such salts should be used as an aqueous solution of a concentration within the range from 30 weight % to saturation. When the concentration is outside the lower limit of the range, there is substantially no effect on the regeneration of the gel. As the aqueous solution it is preferable to use a water solution, from the viewpoint of its industrial advantage, but it is also possible to use an aqueous mixed solvent composed of water and a water-miscible organic solvent such as methanol, ethanol, acetone, dimethylformamide, dimethyl sulfoxide, etc. so far as such an aqueous mixed solvent does not lower the solubility of the salt to make the above-mentioned range of concentration unsatisfactory.

Also, as the treating temperature, it is necessary to employ a temperature within the range of from 50° to 120° C., preferably from 90° to 110° C. When the temperature is outside the lower limit of this range, it is almost impossible to display the effect of regeneration treatment, and when the temperature exceeds the upper limit of the range, the gel may become denatured.

As regards the treating pressure, either atmospheric pressure or increased pressure may be used. As for the treating time, it is necessary to vary it depending on the kind of the salt to be used, its concentration, treating temperature, etc., so that it is difficult to determine it simply. However, at a temperature above 90° C., it is generally desirable to employ a treating time of from 5 to 60 minutes, preferably from 10 to 40 minutes, and in the temperature range from 50° to 90° C., it is desirable to employ a treating time of more than 40 minutes. In addition, such treatment may be carried out continuously in such a manner that, with the gel being packed in a column, the aqueous salt solution is fed into the column at a slow flow rate so that a desired residence time is spent, but it is more desirable to carry out the treatment in a batch manner under suitable vibration, stirring, etc. in a treating bath.

The gel after the regeneration treatment is washed with a solvent, in most cases with water and is then returned to the initial operation state and reused.

The kinds of the gels used for liquid chromatography to which the treatment method of the present invention is applicable are not particularly limited except solid inorganic gels such as porous glass, porous silica gel, etc., and the following relatively soft gels may be mentioned: cross-linked dextran polymer gels (included herein are those containing a trace amount of carboxyl groups) produced from purified dextran, a polysaccharide, by cross-linking it with epichlorohydrin, etc. and having a three-dimensional network structure made hydrophilic and water-insoluble by the formation of glycerin side chains, examples of such gels being Sephadex LH-20 and Sephadex G-10, G-15, G-25, G-50, etc. produced by Pharmacia Fine Chemical; cross-linked polymer gels composed substantially of units of acrylamide or a derivative thereof, for example cross-linked acrylamide-methylenebisacrylamide polymer gels, cross-linked acrylamide-methacrylamide-methylenebisacrylamide polymer gels, cross-linked acrylamide-methylenebisacrylamide-1-vinyl-2-pyrrolidinone polymer gels, cross-linked methylenebisacrylamidevinylethyl carbitol polymer gels, cross-linked acrylamide-N,N-dimethylacrylamide-methylenebisacrylamide polymer gels, cross-linked N,N-dimethylacrylamide-methylenebisacrylamide polymer gels, cross-linked acrylamide-N-methylolacrylamide polymer gels, cross-linked acrylamide-2-hydroxyethyl methacrylate polymer gels, acrylamide polymers cross-linked with formaldehyde or glyoxal (such cross-linked polymer gels may contain units of other known vinyl monomers such as acrylic acid, methacrylic acid, sodium vinylsulfonate, potassium p-styrene sulfonate, dimethylaminoethyl methacrylate, etc.), examples of such gels being those sold on the market under the name of Bio-Gel P-2, ... P-300 produced by Bio-Rad Laboratories; agar gels such as Bio-Gel A 0.5 to 150; cross-linked polystyrene gels such as Bio-Beads S-X1 and S-X2; cross-linked polyvinyl acetate gels such as Merck-O-Gel OR-750 produced by E. Merck Co.; cross-linked polyethylene glycol dimethacrylate gels such as Merck-O-Gel PGM-2000; silanolpolyoxyethylene gels such as Toyopearl EW-35 produced by Toyo Soda Manufacturing Co., Ltd. For such gels it is desirable that, before being subjected to the regeneration treatment, the impurities such as deposits present on the surface of contaminated gel particles or among the interstices of such particles should be removed by means of decantation or washing with a neutral detergent.

It is not fully understood why the contaminated gel which has become less active in separation performance can be effectively regenerated by the treatment with an aqueous solution of a specific salt under particular condition. However a possible supposition is that the bonding forces due to the interaction between the gel and the contaminants, such as Van der Waals force, hydrophobic bonds, hydrogen bonds, etc. are weakened by the presence of such a specific salt, or the contaminants are replaced with the specific salt, whereby the contaminants are removed.

It is an advantage worthy of special mention of the present invention that the contaminated gel which has become less active in separation performance can be regenerated by the simple operation, thereby prolonging the life of the gel, elevating the separation treatment power, and making it easy to apply the liquid chromatographic technique to various fields on an industrial scale.

In the following, the present invention will be explained in more detail by way of examples, but it is to be understood that the invention is not limited for its scope by the description of these examples, in which the percentages are by weight unless otherwise indicated.

The gel activity (%) as described in the following examples is measured and calculated by the following method:

A gel to be evaluated is packed almost up to the highest density into a column having an inner diameter of 1.5 cm and a height of 30 cm. Into this column, 250 ml of a 5% aqueous solution of sodium thiocyanate (PRS) is poured. Then, as the eluent, pure water at 35° C. is caused to flow at the rate of 1 ml/min. An elution curve is obtained using a differential refractometer (produced by Laboratory Data Control Inc.) as the detector. By substracting the volume (ml) of the interstices among the gel particles from the eluted volume of NaSCN at the peak position on the elution curve, a value is obtained which is the net volume of eluted NaSCN (Ve ml). In the same way, the net volume of eluted NaSCN when the column is packed with particles of a fresh gel (Vs ml) is obtained. The gel activity is calculated by the following formula:

$$\text{Gel activity (\%)} = \frac{Ve}{Vs} \times 100$$

The nearer this value to 100, the nearer is the separation performance (adsorption and elution) of the gel to that of the fresh gel.

EXAMPLE 1

In a wet spinning process for producing acrylic fibers in which an concentrated aqueous solution of NaSCN was used as the solvent, a contaminated gel (Sephadex G-10) which had been used for 5 years in the purification process of said solvent and had become less active in separation performance, was decantation-treated with water three times and then filtered by suction to prepare a gel to be evaluated.

Twenty grams of this gel was dispersed again in 200 ml of each of the various regeneration treating agents described in Table 1, and the dispersions thus obtained were caused to stand at each of the temperatures for each of the times described in Table 1, respectively. The gels thus regeneration-treated were filtered by suction and were washed with water three times on the filter. The regenerated gels were measured for the gel activity (%). The results of measurement is shown in Table 1.

Incidentally, in the case of evaluation of the contaminated gels without subjecting them to pretreatment (decantation). the evaluation was impossible because of an excessive pressure loss.

TABLE 1

| Experiment no. | Regeneration treatment conditions | | | Gel activity (%) | |
|---|---|---|---|---|---|
| | Kind of treating agent | Temperature (°C.) | Time | | |
| 1 | 50% aqueous NaSCN sol'n | 20 | 30 days | 69 | |
| 2 | 50% aqueous NaSCN sol'n | 60 | 3 hrs | 72 | ○ |
| 3 | 50% aqueous NaSCN sol'n | 105 | 30 min | 78 | ○ |
| 4 | 30% aqueous NaSCN sol'n | 110 | 30 min | 73 | ○ |
| 5 | 50% aqueous NH₄SCN sol'n | 105 | 30 min | 77 | ○ |
| 6 | 50% aqueous NaI sol'n | 105 | 30 min | 72 | ○ |
| 7 | 50% aqueous Na₂SO₄ sol'n | 105 | 30 min | 70 | |
| 8 | Water | 100 | 3 hrs | 70 | |
| 9 | Dimethyl sulfoxide | 100 | 3 hrs | 70 | |
| 10 | 0.2% aqueous Family ® sol'n (The Lion Fat and Oil Co., Ltd.) | 25 | 24 hrs | 70 | |

TABLE 1-continued

| Experiment no. | Regeneration treatment conditions Kind of treating agent | Temperature (°C.) | Time | Gel activity (%) |
|---|---|---|---|---|
| 11 | None (pretreatment only) | | | 67 |

Note: The O marks indicate experiments of the invention.

It is understood from the results in Table 1 that when the treating agents of the present invention are used, the regeneration effect is produced in a short time, while when the treating agents deviating from the present invention are used, almost no effect is produced even after treatment for a long time.

EXAMPLE 2

A contaminated gel (Merck-O-Gel PGM-2000) which had been used for 5 years in the solvent purification process as in Example 1 and had become less active in separation performance was subjected to the regeneration treatment in the same way as in Experiment No. 3 of Example 1. The gel activity recovered to 77% from 67% which was the activity after the pretreatment only.

EXAMPLE 3

A gel (Sephadex G-25) which had been used for two years in the demineralization process of dextran and had become less active in separation performance, was subjected to the regeneration treatment in the same way as in Experiment No. 5 of Example 1. The gel activity recovered to 78% from 68% which was the gel activity after the pretreatment only.

Demineralization operation of dextran was carried out using the gel after the regeneration treatment. It was observed that the gel was greatly improved in separation performance in comparison with that before the regeneration treatment.

What is claimed is:

1. A method of regenerating gels for use in liquid chromatography, characterized in that a gel which has become less active in separation performance is treated with an aqueous solution of a metallic salt or ammonium salt or a member selected from the group consisting of a salt of thiocyanic acid or hydrogen iodide having a concentration of from 30 weight % to saturation, at a temperature between 50° and 120° C.

2. The method as claimed in claim 1 wherein said gel is treated with an alkali-metal salt or the ammonium salt of thiocyanic acid.

3. The method as claimed in claim 1 wherein said gel is treated batchwise under vibration or stirring in a treating bath.

* * * * *